US006876990B2

(12) United States Patent
Yamanishi et al.

(10) Patent No.: US 6,876,990 B2
(45) Date of Patent: Apr. 5, 2005

(54) QUESTIONNAIRE ANALYSIS SYSTEM

(75) Inventors: Kenji Yamanishi, Tokyo (JP); Hang Li, Tokyo (JP)

(73) Assignee: NEC Corporation, Tokyo (JP)

( * ) Notice: Subject to any disclaimer, the term of this patent is extended or adjusted under 35 U.S.C. 154(b) by 456 days.

(21) Appl. No.: 09/805,114

(22) Filed: Mar. 14, 2001

(65) Prior Publication Data

US 2002/0004790 A1 Jan. 10, 2002

(30) Foreign Application Priority Data

Mar. 15, 2000 (JP) ........................................ 2000-071657

(51) Int. Cl.[7] .............................. G06F 17/00; G06N 5/00
(52) U.S. Cl. ............................... 706/45; 706/46; 706/47
(58) Field of Search ............................... 706/45, 46, 47

(56) References Cited

U.S. PATENT DOCUMENTS

| 6,212,532 | B1 | * | 4/2001 | Johnson et al. | ............. | 715/500 |
| 6,332,143 | B1 | * | 12/2001 | Chase | ........................ | 707/100 |
| 6,477,551 | B1 | * | 11/2002 | Johnson et al. | ............. | 715/531 |
| 6,498,921 | B1 | * | 12/2002 | Ho et al. | ..................... | 434/362 |
| 6,560,590 | B1 | * | 5/2003 | Shwe et al. | ..................... | 706/55 |
| 2001/0049688 | A1 | * | 12/2001 | Fratkina et al. | ........... | 707/104.1 |
| 2002/0032037 | A1 | * | 3/2002 | Segawa | ...................... | 455/517 |

FOREIGN PATENT DOCUMENTS

| JP | H2-98775 A | 4/1990 |
| JP | 08-166965 | 6/1996 |
| JP | H8-166965 A | 6/1996 |
| JP | 2581196 | 11/1996 |
| JP | H9-114802 A | 5/1997 |
| JP | H11-15832 A | 1/1999 |
| JP | 11-66036 | 3/1999 |
| JP | 11-143856 | 5/1999 |
| JP | H11-143856 A | 5/1999 |
| JP | 2940501 | 6/1999 |
| JP | H11-167581 A | 6/1999 |
| JP | H11-250072 A | 9/1999 |
| JP | 11-250100 | 9/1999 |
| JP | H11-345241 A | 12/1999 |

OTHER PUBLICATIONS

DE–FACTO®, Communications Excellence Dentsu, Mar. 1999, pp. 1–5.
I. Watanabe, "Keyword Associator", 2nd Edition, Research Group Paper of 15th Meeting of System Engineering Group of Society of Measurement and Automatic Control of Japan, Jul. 1994, pp. 1–8.
Watanabe et al., "HIPS", Research Group Paper of 17th Meeting of System Engineering Group Society of Measurement and Automatic Control of Japan, Jan. 1995, pp. 1–8.
Li et al., "Text Classification Using ESC–based Stochastic Decision Lists", *Proceedings of 8th International Conference on Information and Knowledge Management*, CIKM '99, 1999, pp. 122–130.
J. Rissanen, "Fisher Information and Stochastic Complexity", *IEEE Transactions on Information Theory*, vol. 42, No. 1, Jan. 1996, pp. 40–47.
K. Yamanishi, "A Decision–Theoretic Extension of Stochastic Complexity and Its Applications to Learning", *IEEE Transactions on Information Theory*, vol. 44, No. 4, Jul. 1998, pp. 1424–1439.

* cited by examiner

*Primary Examiner*—Anthony Knight
*Assistant Examiner*—Joseph P. Hirl
(74) *Attorney, Agent, or Firm*—Sughrue Mion, PLLC

(57) ABSTRACT

An object of the present invention is to analyze questionnaire replies automatically from questionnaire reply statements including free reply description in natural language collected through a network, by using a text classification engine, and to issue the analysis results of the claimant as the knowledge in the rule formats. Questionnaire respondents send questionnaire reply statements from respondent computers. Questionnaire reply statements are accumulated in a database through a network. A text classification engine reads out accumulated questionnaire reply statements from the database, and learns the rules for classifying the questionnaire reply statements, and issues them to the claimant.

10 Claims, 10 Drawing Sheets

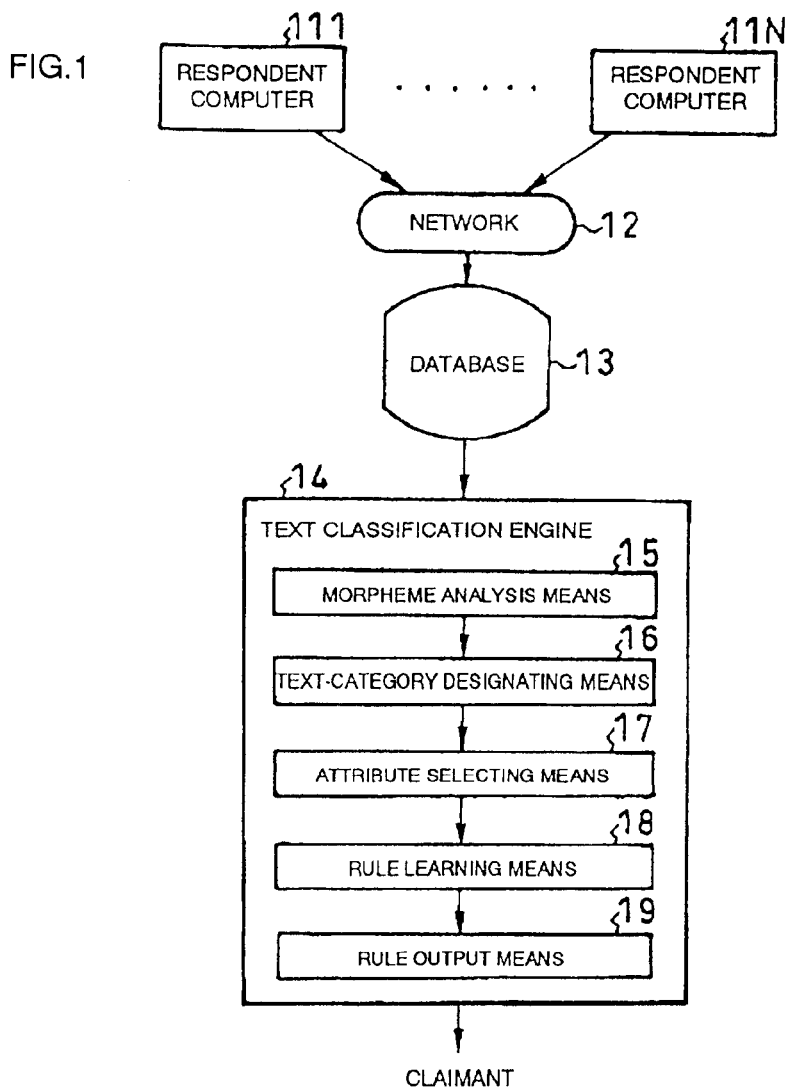

| | | | |
|---|---|---|---|
| COMPANY A | ← | EASY TO USE | [92.0%] |
| COMPANY A | ← | FUTURE & PRIVATE | [87.2%] |
| COMPANY A | ← | FATIGUE & RELIEF | [78.0%] |
| COMPANY A | ← | EASY | [65.8%] |
| COMPANY A | ← | PLEASANT | [56.2%] |
| OTHER THAN COMPANY A | ← | OR ELSE | [79.4%] |

| | | | |
|---|---|---|---|
| COMPANY B | ← | QUICK | [82.0%] |
| COMPANY B | ← | MACHINE & EFFICIENCY | [77.8%] |
| COMPANY B | ← | MACHINE & MANIPULATION | [76.0%] |
| COMPANY B | ← | CLEVER | [60.8%] |
| COMPANY B | ← | EXCELLENT | [60.2%] |
| OTHER THAN COMPANY B | ← | OR ELSE | [76.4%] |

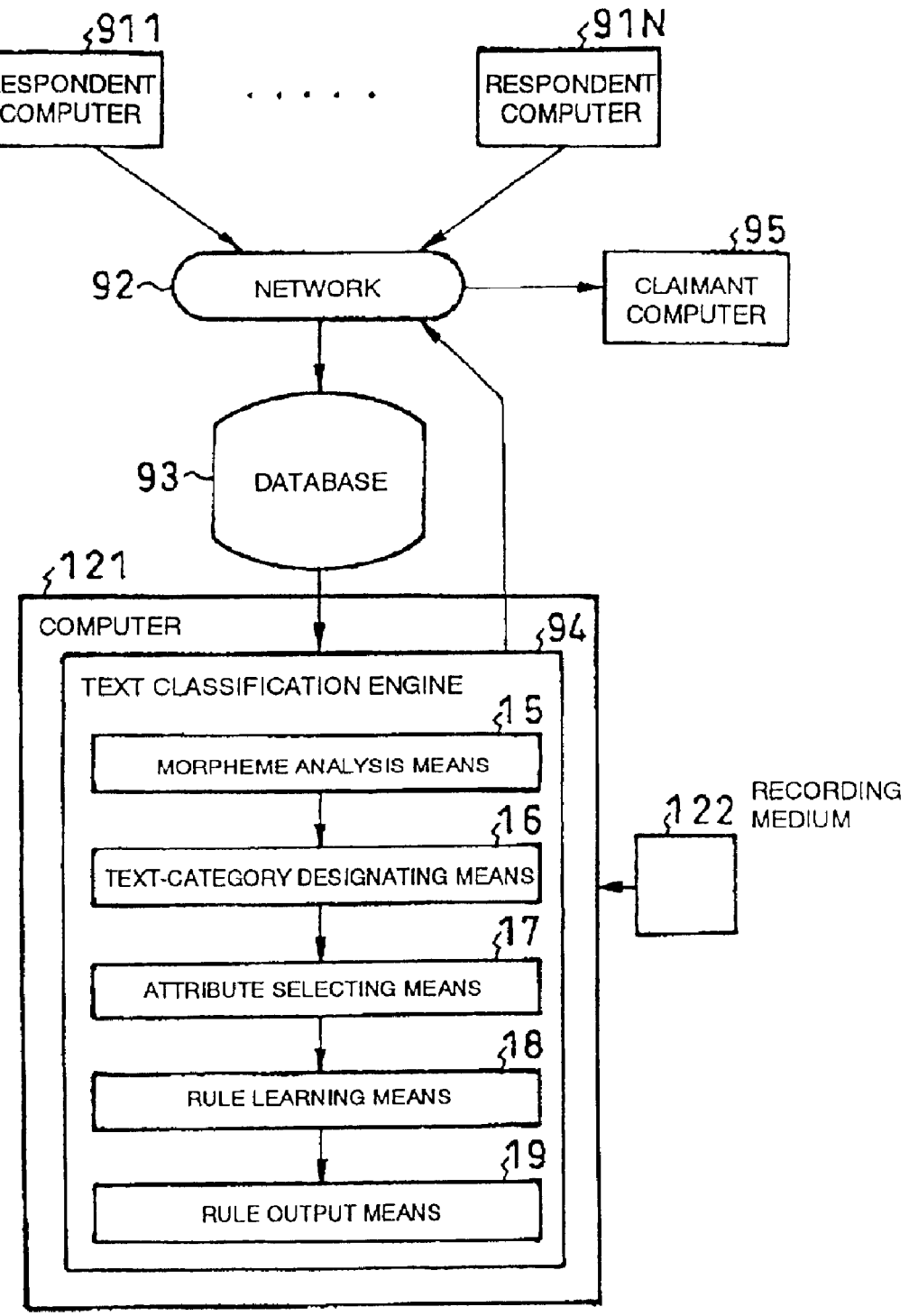

FIG. 13A $$SC(c^m) = mH\left(\frac{m^+}{m}\right) + \frac{1}{2}\log\frac{m}{2\pi} + \log\pi \qquad (1)$$

FIG. 13B $$H(z) \stackrel{def}{=} -z\log z - (1-z)\log(1-z) \qquad (2)$$

FIG. 13C $$SC(c^{m_\omega}) = m_\omega H\left(\frac{m_\omega^+}{m_\omega}\right) + \frac{1}{2}\log\frac{m_\omega}{2\pi} + \log\pi \qquad (3)$$

FIG. 13D $$SC(c^{m_{\neg\omega}}) = m_{\neg\omega} H\left(\frac{m_{\neg\omega}^+}{m_{\neg\omega}}\right) + \frac{1}{2}\log\frac{m_{\neg\omega}}{2\pi} + \log\pi \qquad (4)$$

FIG. 13E $$\Delta SC(\omega) = \frac{1}{m}\left(SC(c^m) - (SC(c^{m_\omega}) + SC(c^{m_{\neg\omega}}))\right)$$

$$= \left[H\left(\frac{m^+}{m}\right) - \frac{m_\omega}{m}H\left(\frac{m_\omega^+}{m_\omega}\right) - \frac{m_{\neg\omega}}{m}H\left(\frac{m_{\neg\omega}^+}{m_{\neg\omega}}\right)\right]$$

$$- \left[\frac{1}{2m}\log\frac{m_\omega m_{\neg\omega}\pi}{2m}\right] \qquad (5)$$

FIG. 13F $$ESC(c^m) = Loss(c^m) + \lambda\sqrt{m \log m} \qquad (6)$$

FIG. 13G $$ESC(c^{m_t}) = Loss(c^{m_t}) + \lambda\sqrt{m_t \log m_t} \qquad (7)$$

FIG. 13H $$ESC(c^{m_{\neg t}}) = Loss(c^{m_{\neg t}}) + \lambda\sqrt{m_{\neg t} \log m_{\neg t}} \qquad (8)$$

FIG. 13 I $$\begin{aligned}\Delta ESC(t) &= ESC(c^m) - (ESC(c^{m_t}) + ESC(c^{m_{\neg t}})) \\ &= \left[Loss(c^m) - Loos(c^{m_t}) - Loos(c^{m_{\neg t}})\right] \\ &\quad + \left[\lambda(\sqrt{m \log m} - \sqrt{m_t \log m_t} - \sqrt{m_{\neg t} \log m_{\neg t}})\right]\end{aligned} \qquad (9)$$

FIG. 13J $$(m_{t^*}^+ + 0.5)/(m_{t^*} + 1) \qquad (10)$$

FIG. 13K $$ESC(c^m | A) = \sum_t ESC(c^{m_t}) \qquad (11)$$

FIG. 13L $$\begin{aligned}ESC(c^m : A) &= ESC(c^m | A) + \lambda' L(A) \\ &= \sum_t Loss(c^{m_t}) + \lambda \sum_t \sqrt{m_t \log m_t} + \lambda' L(A)\end{aligned} \qquad (12)$$

QUESTIONNAIRE ANALYSIS SYSTEM

BACKGROUND OF THE INVENTION

1. Technical Field of the Invention

The present invention relates to a questionnaire analysis system, and more particularly to a questionnaire analysis system using text automatic classification, natural language processing, and network utilization.

2. Description of the Prior Art

The operation for extracting general features and tendency from questionnaire reply statements including free reply description in natural language obtained through the network such as the Internet has been conventionally done almost manually. Text mining tools such as DE-FACTO developed by Dentsu (published in leaflet), Keyword Associator of Fujitsu (I. Watanabe: Divergent thought support system "Keyword Associator" 2nd edition, research group paper of 15th Meeting of System Engineering Group of Society of Measurement and Automatic Control of Japan, July 1994), and "HIPS" (Watanabe, Miki, Nitta, Sugiyama: Hybrid thought support system HIPS, research group paper of 17th Meeting of System Engineering Group of Society of Measurement and Automatic Control of Japan, January 1995) were used for extracting the relationship of words from the text information. However, these tools could not express the features of questionnaire reply statements in a format of a rule.

So far, nothing has been known about the system or service for collecting and analyzing questionnaire reply statements including free reply description in natural language automatically through the network such as the internet, and distributing the analysis results, if necessary, to the claimant. For example, in JP 11-066036 A (1999), or JP 11-143856 A (1999), the technology for inquiring through the network and accumulating the replies in the database is disclosed, but features of questionnaire reply statements are not extracted in a format of a rule.

In the conventional manual questionnaire analysis mentioned above, when there are huge number of the number of questionnaire replies, the manual analysis becomes inefficient.

In text mining tools such as DE-FACTO and HIPS, features of questionnaire replies cannot be extracted in a format of a rule. Therefore, it was not sufficient from the viewpoint of presentation of compact and easy knowledge.

Although conventional text classification tools used for information retrieval are also useful for analysis of questionnaire replies, they are not used yet in the analysis of questionnaire replies including free reply description in natural language.

Therefore, an object of the present invention is to provide a questionnaire analysis system capable of automatically presenting knowledge in a compact and easy rule from questionnaire reply statements including free reply description in natural language by using a text classification engine.

Another object of the present invention is to provide a questionnaire analysis system for distributing analysis results to the claimant by automatically extracting the knowledge in the rule format from the questionnaire reply statements collected through the network.

A questionnaire analysis system of the present invention comprises means for inputting a questionnaire statement including free reply description in natural language, a network for transmitting the questionnaire reply statement, a database for accumulating the transmitted questionnaire reply statements, and a text classification engine for reading out the questionnaire reply statements from the database and learning a rule for classifying the questionnaire reply statements.

Further, a questionnaire analysis system of the present invention may comprise means for inputting a questionnaire statement including free reply description in natural language, a database for accumulating the transmitted questionnaire reply statements, and a text classification engine for reading out the questionnaire reply statements from the database and learning a rule for classifying the questionnaire reply statements.

Moreover, a questionnaire analysis system of the invention may comprise means for inputting a questionnaire statement including free reply description in natural language, a network for transmitting the questionnaire reply statement, a database for accumulating the transmitted questionnaire reply statements, a text classification engine for reading out the questionnaire reply statements from the database and learning a rule for classifying the questionnaire reply statements, and means for distributing the rule through the network according to a request from a claimant.

According to the present invention, by receiving orders for enterprise image survey or questionnaire about specific merchandise or service from claimants, the questionnaire is operated on the network, and the questionnaire reply statements including free reply description in natural language collected online through the network are accumulated in the database, and questionnaire reply statements are called therefrom, and the rules obtained by using the text classification engine are sold to the claimants as the analysis results.

Further, according to the present invention, by receiving orders for enterprise image survey or questionnaire about specific merchandise or service from claimants, the questionnaire is operated, and the questionnaire reply statements including free reply description in natural language are collected at once, and accumulated in the database, and questionnaire reply statements are called therefrom, and the analysis results obtained by using the text classification engine are sold to the claimants.

Furthermore, according to the present invention, by receiving orders for enterprise image survey or questionnaire about specific merchandise or service from claimants, the questionnaire is operated on the network, and the questionnaire reply statements including free reply description in natural language collected online through the network are accumulated in the database, and questionnaire reply statements are called therefrom, and the analysis results obtained by using the text classification engine are distributed through the network to the claimants when requested.

BRIEF EXPLANATION OF THE DRAWINGS

FIG. 1 is a block diagram showing a configuration of a questionnaire analysis system according to a first embodiment of the present invention.

FIG. 2 is a diagram showing an example of questionnaire reply statements accumulated in a database in FIG. 1.

FIG. 12 is a block diagram showing a configuration of a questionnaire analysis system according to a sixth embodiment of the invention.

FIGS. 13A to 13L are formulae (1) to 12 for calculating $\Delta SC(\omega)$ (the difference between the stochastic complexity (SC) of a text set without consideration of appearance of word $\omega$ and the SC with consideration thereof, and $\Delta ESC(t)$ (the decrement of the ESC (extended SC), when a term "t" is selected.

PREFERRED EMBODIMENT OF THE INVENTION

First Embodiment

Figure 3:
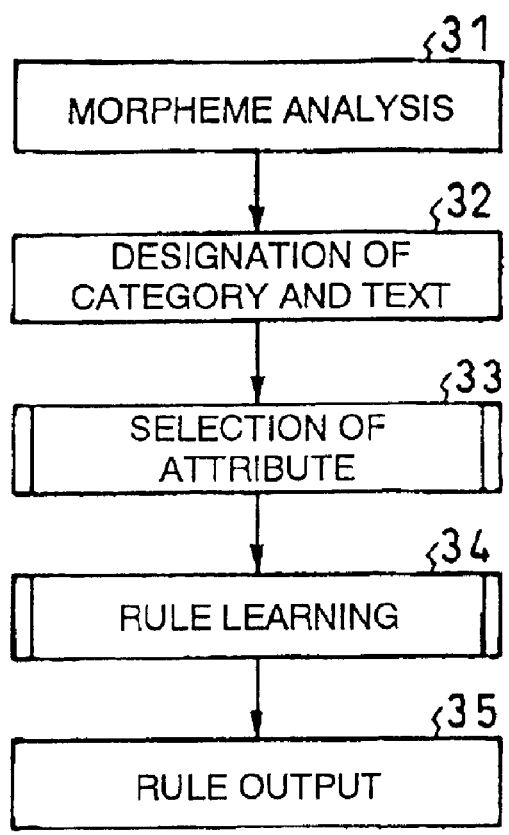
FIG. 3 is a flowchart showing processing in a text classification engine in FIG. 1.

FIG. 1 is a block diagram showing a configuration of a questionnaire analysis system according to a first embodiment of the invention. The questionnaire analysis system of the first embodiment comprises respondent computers 111 to 11N (N being a positive integer), a network 12, a database 13, and a text classification engine 14.

The respondent computers 111 to 11N are computers, portable information terminals, cellular phones, and other devices having transmission function of message, mail and the like, which are connected to the network 12.

The network 12 includes various networks, whether wired or wireless, such as public networks, exclusive networks, or LAN (local area network).

The database 13 is connected to the network 12, and questionnaire reply statements from plural respondents transmitted from the respondent computers 111 to 11N through the network 12 are accumulated herein.

The text classification engine 14 reads out plural questionnaire reply statements from the database 13, extracts a rule for classifying the questionnaire reply statements, and issues the rule to the claimant. The text classification engine 14 includes morpheme analysis means 15 for analyzing morphemes in all sentences in the questionnaire reply statements accumulated in the database 13, category-text designating means 16 for designating the category and text in the text classification engine 14, attribute selecting means 17 for selecting attributes in plural questionnaire reply statements being read in from the database 13, rule learning means 18 for learning the rule for expressing the correspondence of text and category on the basis of the words selected by attributes by the attribute selecting means 17, and rule output means 19 for issuing the rule.

The text classification engine 14 is an engine for learning the corresponding relation of the category and text as a classification rule, and, for example, an engine proposed by Li and Yamanishi can be used (H. Li and K. Yamanishi: Text Classification Using ESC-based Stochastic Decision Lists, Proceedings of 1999 International Conference on Information & Knowledge Management, pp. 122–130, 1999). This text classification engine basically conforms to the system of "Forming method and apparatus of decision list" disclosed in Japanese Patent No. 2581196.

FIG. 2 shows a composition of a set of questionnaire reply statements accumulated in the database 13. Each row expresses a questionnaire item, and each line shows the reply statement of one person.

Referring to FIG. 3, processing of the text classification engine 14 comprises morpheme analysis step 31, designating step 32 of text and category, attribute selecting step 33, rule learning step 34, and rule output step 35.

Figure 4:
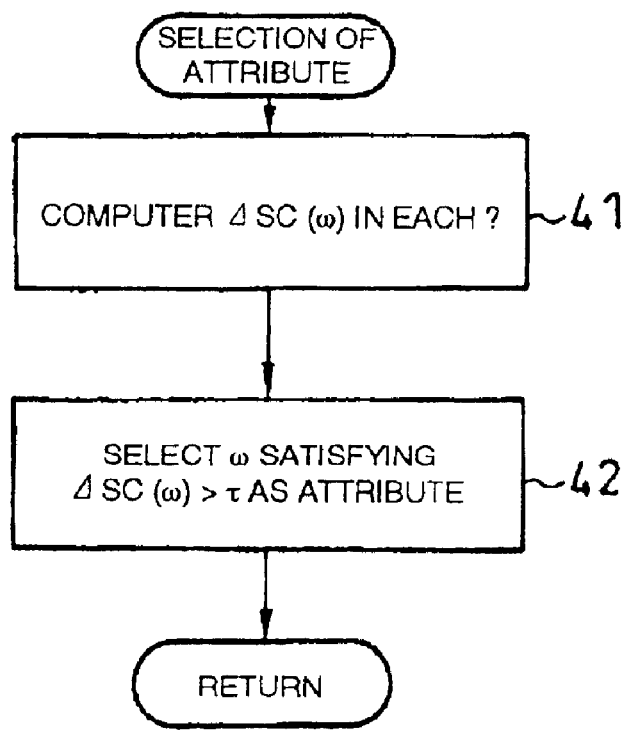
FIG. 4 is a flowchart showing a more specific processing of attribute selecting step in FIG. 3.

Referring to FIG. 4, a more specific processing of attribute selecting step 33 includes $\Delta SC(\omega)$ computing step 41, and attribute selecting step 42.

Figure 5:
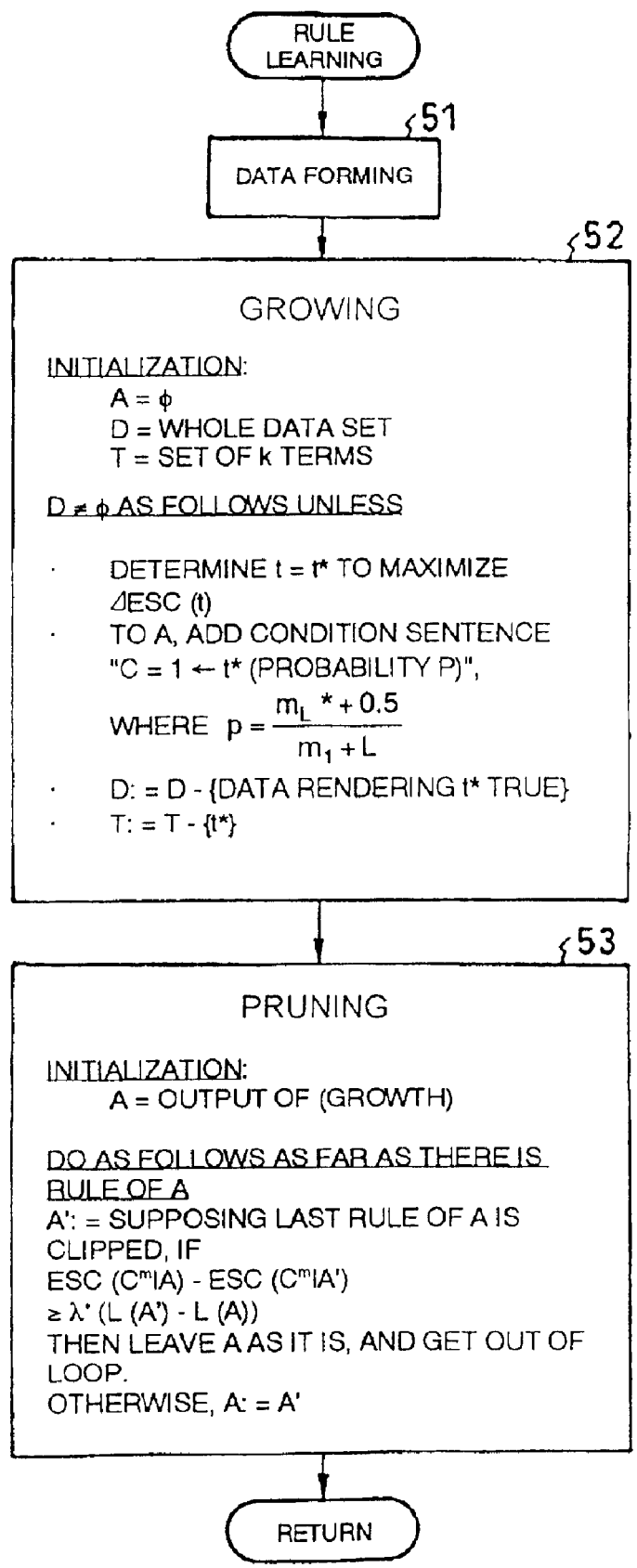
FIG. 5 is a flowchart showing a more specific processing of rule learning step in FIG. 3.

Referring to FIG. 5, a more specific processing of rule learning step 34 includes data forming step 51, growing step 52, and pruning step 53.

Figures 6, 7, 8:
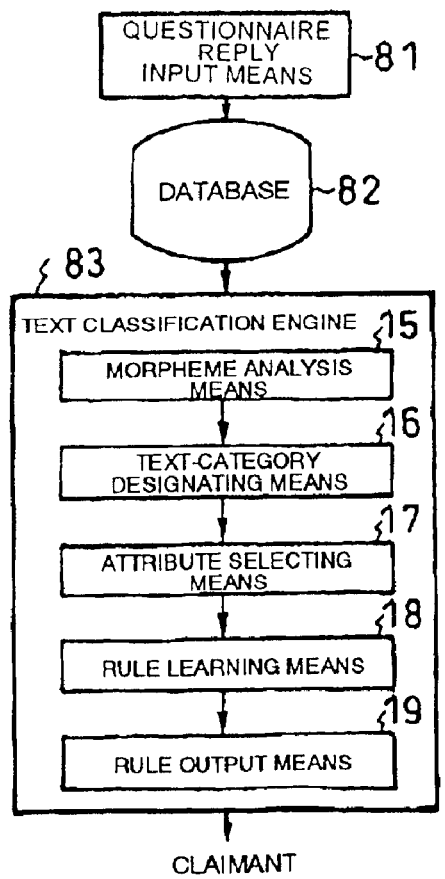
FIG. 6 is a diagram showing an example of rule format knowledge (stochastic decision list) as a result of analysis by the text classification engine in FIG. 1.
FIG. 7 is a diagram showing other example of rule format knowledge (stochastic decision list) as a result of analysis by the text classification engine in FIG. 1.
FIG. 8 is a block diagram showing a configuration of a questionnaire analysis system according to a second embodiment of the present invention.

FIG. 6 is a diagram showing an example of rule format knowledge (stochastic decision list) as a result of analysis by the text classification engine 14.

FIG. 7 is a diagram showing other example of rule format knowledge (stochastic decision list) as a result of analysis by the text classification engine 14.

In the questionnaire analysis system of the first embodiment having such configuration, the operation is explained below.

When questionnaire respondents send questionnaire reply statements from the respondent computers 111 to 11N, the questionnaire reply statements are stored into the database 13 through the network 12. Suppose the number of respondents to be N. At this time, the questionnaire reply statements may include free reply description in natural language.

The text classification engine 14, first by the morpheme analysis means 15, analyzes morphemes in all sentences of questionnaire reply statements accumulated in the database 13 (step 31).

Next, by the category-text designating means 16, the text classification engine 14 causes the operator to designate the category and text in the questionnaire reply statements (step 32). Herein, designation of category is to classify by paying attention to the replies in one column. For example, it is the category designation that, relating to the first row in FIG. 2, the replies are classified into "company A", and "other than company A". The text designation is to designate the rows to be used in analysis except for the row used in category designation. For example, the text is designated by selecting the second row in FIG. 2.

Further, the text classification engine 14, by the attribute selecting means 17, selects the attributes in plural questionnaire reply statements being read in from the database 13 (step 33). The attribute selection is to select a word which is important for expressing the correspondence of text and category.

Then, the text classification engine 14 learns the rule for expressing the correspondence of text and category on the basis of the word selected by attribute by the rule learning means 18 (step 34). For example, when the category and text are designated as stated above, the rule is obtained as shown in FIG. 5.

The rule in FIG. 6 shows that if the word "easy to use" is found in the text by reading the first line, 92.0% of the respondents assume company A as the high-tech enterprise. If the word "easy to use" is not found, next, checking if the words "future" and "private" appear at the same time, and when found, it means that 87.2% of the respondents assume company A as the high-tech enterprise. Thereafter, similarly, according the rule of if-then-else pattern, the conditional sentences are read from top to bottom. Such rule is an easy and compact expression of the relation between the high-tech enterprise and high-tech feeling.

Picking up other company B, when the category is designated into "company B" and "other than company B", the rule in FIG. 7 is obtained by the same procedure.

Comparing the rule of company B in FIG. 7 with the rule of company A in FIG. 6, the high-tech feeling of the respondents assuming company A as the high-tech enterprise is mainly based on the ease of use and preference sensation, while the high-tech feeling of the respondents assuming company B as the high-tech enterprise is known to be mainly based on the efficiency. Thus, by comparing the rules, the questionnaire replies can be analyzed easily.

Finally, the text classification engine 14, by the rule output means 19, issues the knowledge of the analysis result in the rule format to the claimant (step 35).

As an example of knowledge in rule format, herein, the stochastic decision rule is discussed, and the attribute selecting step 33 for creating it and the rule learning step 34 are more specifically described below.

The stochastic decision list is a ranked list of stochastic rule of if-then pattern as shown in FIG. 6. Each stochastic rule has a pattern of "c=1←t (probability p)", where c=1 is the decision of classification, t is the condition of classification, and (probability p) is the probability.

First, attribute selecting step 33 is explained.

The attribute selection is to collect words closely related with the category in the given category (for example, company A and other than company A). More specifically, as shown in FIG. 4, at step 41, in each word $\omega$ appearing in the text, the difference $\Delta SC(\omega)$ between the stochastic complexity (SC) of the text set without consideration of onset of the word $\omega$ and the SC with consideration thereof is computed, and at step 42, when the difference $\Delta SC(\omega)$ is greater than the given threshold $\tau$, the word $\omega$ is selected as an attribute.

A practical method of computing the SC is explained. Sets of texts in the entered questionnaire reply statements are expressed as $(d_1, c_1), (d_2, c_2), \ldots, (d_m, c_m)$ where $d_i$ denotes the i-th text, and is expressed as the row of words appearing in the i-th text, $c_i$ denotes the value of category (label) corresponding to the i-th text, and each $c_i$ is 1 if belonging to the given category (company A) or 0 otherwise (other than company A), and m is the number of texts.

Further, a label sequence is expressed as $c^m=c_1, \ldots, c_m$, and a text sequence is expressed as $d^m=d_1, \ldots, d_m$. The SC of label sequence $c^m$ is calculated as in formula (1), where $m^+$ is the number of labels in which the value is 1 in label sequence $c^m$, and log is the natural logarithm.

H(z) is defined by formula (2).

For example, as discussed by J. Rissanen and Fisher information and stochastic complexity (IEEE Trans. on Information Theory, 42 (1), 40–47, 1996), SC($c^m$) is the shortest description length for describing the label sequence $c^m$ by using the given model (herein, Bernoulli model). Suppose $C^{m\omega}$ is a label sequence composed of label $c_i$ in which word $\omega$ appears in the corresponding text $d_i$, where $m_\omega$ is the number of labels in $C^{m\omega}$.

Then, the value of SC in $C^{m\omega}$ can be calculated by formula (3), where $m_\omega^+$ is the number of labels of which value is 1 in $C^{m\omega}$.

On the other hand, suppose $C^m\neg\omega$ is a label sequence composed of label $c_i$ in which word $\omega$ does not appear in the corresponding text $d_i$, where $m\neg\omega$ is the number of labels in $C^m\neg\omega$.

Then, the value of SC in $C^m\neg\omega$ can be calculated by formula (4).

The difference $\Delta SC(\omega)$ between the SC without consideration of appearance of word $\omega$ and the SC with consideration thereof is calculated by formula (5).

The word $\omega$ large in the difference $\Delta SC(\omega)$ is a word appearing very frequently or hardly in a given category. Such words are considered to be closely related with the category. Supposing $\tau$ to be a given threshold, the word $\omega$ in the relation of $\Delta SC(\omega)>\tau$ is selected as an attribute.

The rule learning step 34 is explained below.

Suppose there are n words selected of attribute, being $\omega_1, \ldots, \omega_n$. At step 51, first of all, sets of entered texts are expressed as follows.

$(d_1, c_1), (d_2, c_2), \ldots, (d_m, c_m)$

Here, each $d_i$ expresses a binary vector (generally, a multi-valued discrete vector)

$d_i=(\omega_{i1}, \omega_{i2}, \ldots, \omega_{in}) (i=1, \ldots, m)$

Here, $\omega_{ij}$ is 1 when the word $\omega_j$ obtained by attribute selection appears in the i-th text, or 0 otherwise (j=1, \ldots, n), $c_i$ expresses the value (label) of the category corresponding to the i-th text, and each $c_i$ is 1 when belonging to the specified category, and 0 otherwise, and m is the number of texts.

At step 52, the rule of if-then-else pattern is selected, and sequentially added to the stochastic decision list A. This is called "growing." For selection of rules, for example, the extended stochastic complexity (ESC) minimum principle is employed.

The operation is as follows. Suppose k is a given positive integer. A set of all possible k terms (up to k link words of word $\omega$) on the basis of the word $\omega$ by attribute selection is supposed to be T. From terms t of the set T, those not appearing in the text at all are excluded. An empty stochastic decision list A is prepared. Next, the rule of the largest decrement of ESC value is sequentially added to the stochastic decision list A.

Herein, the ESC is computer as follows. The whole data set D is expressed as sets of data in a format of $(d_1, c_1), (d_2, c_2), \ldots, (d_m, c_m)$ and label sequence $c^m=c_1, \ldots, c_m$. The value of the ESC of label sequence $c_m$ can be approximated as in formula (6).

This is one approximate format of the original ESC proposed by K. Yamanishi in his paper (A decision-theoretic extension of stochastic complexity and its applications to learning, IEEE Trans. Inform. Theory, 44, 1424–1439, 1998).

Herein, $\lambda$ is a positive constant, Loss ($c^m$) is the number of errors in default classification. The default classification is to assume all labels are 0, for example. t is a term in the set T.

Suppose $c^{mt}$ is a label sequence composed of label $c_i$ in which term "t" is true in the corresponding text $d_i$, where $m_t$ is the number of labels in $c^{mt}$.

Suppose Loss ($c^{mt}$) is the number of errors when classifying by term "t".

On the other hand, $c^m \neg t$ is a label sequence composed of label $c_i$ in which term "t" is false in the corresponding text $d_i$, where $m_{\neg t}$ is the number of labels in $c^m \neg t$. Here, $\neg t$ expresses negation of term "t". Suppose Loss ($c^m \neg t$) is the number of errors when classifying by $\neg t$.

The ESC values of $c^{mt}$ and $c^m \neg t$ can be calculated by formula (7) and formula (8), respectively.

When classifying by term "t", the decrement $\Delta ESC(t)$ of the ESC value is calculated in formula (9).

According to the ESC minimum principle, term "t" is selected so that $\Delta ESC(t)$ may be minimum. When such $t=t^*$ is selected, the number of data of whole data set D in which it is true is supposed to be $m_{t^*}$ and of such data, the label, for example, greater in number is supposed to be $c=1$, and the number of $c=1$ is supposed to be $m_{t^*}^+$, and the number of $c=0$ is supposed to be $m_{t^*}^-$.

The rule "$c=1 \leftarrow t^*$ (probability)" is added to the stochastic decision list A. Herein, the probability value p is calculated, for example, by formula (10) by using the method of Laplacean estimation.

Excluding term "$t^*$" from the set T, a new set T is obtained, and excluding all data rendering term "$t^*$" true from the whole data set D, a new whole data set D is obtained, and the same operation is repeated until the whole data set D becomes empty. Instead of the standard ESC used hereabove, the standard SC used in attribute selection may be used.

At step 53, since the stochastic decision list A obtained at step 52 may excessively conform to the learning data, the rules are removed one by one from the last one of the stochastic decision list A consecutively until none should be removed from the viewpoint of the ESC minimum principle. This process is called clipping.

In this case, the manner of application of the ESC minimum principle is explained below. First, the value of the ESC corresponding to the stochastic decision list A of label sequence $c^m$ is defined by formula (11) as the sum of ESC values corresponding to all terms t in the stochastic decision list A.

Here, ESC($c^{mt}$) is calculated by formula (7).

Next, the whole ESC value of label sequence $c^m$ and stochastic decision list A are defined by formula (12), where $\lambda'$ is a positive constant, and L(A) is a code length for encoding the stochastic decision list A. Specifically, it is calculated as $L(A)=\log T+\log(T-1)+ \ldots +\log T (T-i+1)$, where T is the number of possible terms t, and i is the number of rules in the stochastic decision list A.

Suppose A expresses the stochastic decision list before clipping, and A' is the stochastic decision list after clipping.

When ESC ($c^m|A$)≦ESC ($c^m|A'$), in other expression, when ESC ($c^m|A'$)−ESC ($c^m|A$)≧$\lambda'$ (L(A)−L(A')), the clipping procedure continues, and when this condition is no longer satisfied or there is no rule left to be clipped, the stochastic decision list A obtained at this moment is delivered. Thus, the stochastic decision list A small in the ESC on the whole is issued.

In the questionnaire analysis system of the first embodiment, rules of analysis results can be automatically extracted from the questionnaire reply statements including free reply description in natural language collected through network 12.

In the questionnaire analysis system of the first embodiment, as the text classification engine 14, by using the engine proposed by Li and Yamanishi (H. Li and K. Yamanishi: Text Classification Using ESC-based Stochastic Decision Lists, Proceedings of 1999 International Conference on Information & Knowledge Management, pp. 122–130, 1999), by the computation amount of $O(n^k m)$, rules can be extracted from the questionnaire reply statements at high speed, where n is the number of words of attribute selection from the questionnaire reply statements, m is the number of questionnaire reply statements, and k is the maximum number of words included in the link words relating to one condition. Hence, efficient automatic analysis of questionnaire reply statements is possible. The obtained rules can express the questionnaire reply statements belonging to a specific category in compact and easy format of if-then-else pattern.

The questionnaire analysis system of the first embodiment can be applied, for example, in the following business. Receiving orders for enterprise image survey or questionnaire about specific merchandise or service from claimants, the questionnaire of the items as shown in FIG. 2 is operated on the network 12, and the questionnaire reply statements including free reply description in natural language collected online through the network 12 are accumulated in the database 13, and questionnaire reply statements are called therefrom, and the rules obtained by using the text classification engine 14 are sold to the claimants as the analysis results.

Second Embodiment

FIG. 8 is a block diagram showing a configuration of a questionnaire analysis system according to a second embodiment of the invention. The questionnaire analysis system of the second embodiment comprises questionnaire reply input means 81, a database 82, and a text classification engine 83.

The questionnaire reply input means 81 is directly connected to the database 82 without connecting through network.

The database 82 accumulates questionnaire reply statements from plural questionnaire respondents.

The text classification engine 83 is exactly the same as the text classification engine 14 in the questionnaire analysis system of the first embodiment shown in FIG. 1. Therefore, the corresponding parts are identified with same reference numerals, and their detailed description is omitted.

The operation of the questionnaire analysis system of the second embodiment having such configuration is explained below.

The questionnaire reply input means 81 is directly connected to the database 82 without connecting through network, and receives questionnaire reply statements including free reply description in natural language.

The database 82 accumulates questionnaire reply statements from plural questionnaire respondents.

The text classification engine 83 reads out plural questionnaire reply statements from the database 82, extracts the rules for classifying the questionnaire reply statements, and issues the rules of analysis result to the claimant. The detail of the operation of the text classification engine 83 is same as that of the text classification engine 14 of the questionnaire analysis system of the first embodiment, and the detailed description is omitted.

The questionnaire analysis system of the second embodiment can be applied, for example, in the following business. Undertaking an enterprise image survey or a questionnaire about specific merchandise or service, the questionnaire of the items as shown in FIG. 2 is operated, and the questionnaire reply statements including free reply description in natural language are collected at once, and accumulated in the database 82, and questionnaire reply statements are called therefrom, and the analysis results obtained by using the text classification engine 83 are sold to the claimants.

Third Embodiment

Figure 9:
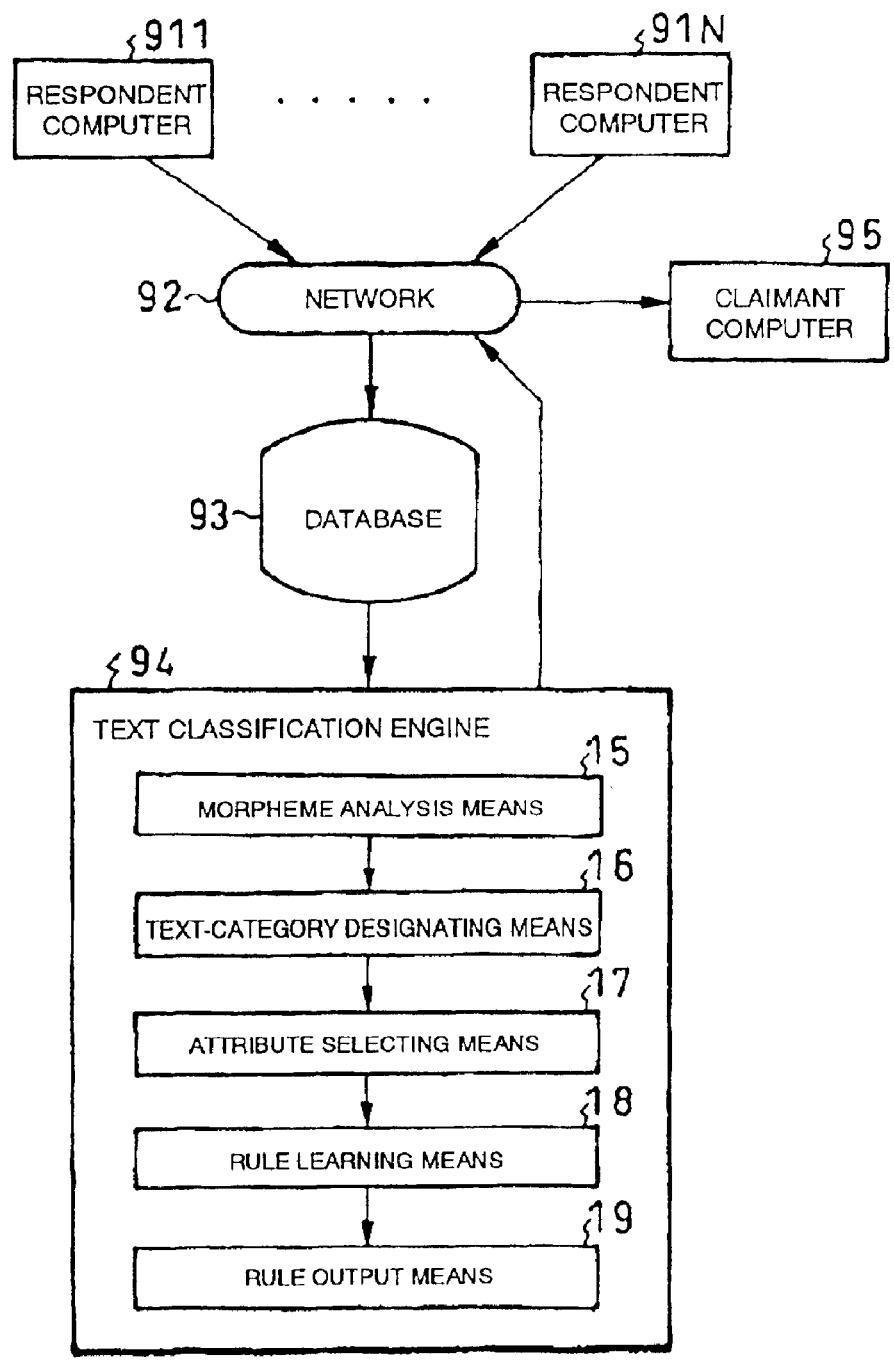
FIG. 9 is a block diagram showing a configuration of a questionnaire analysis system according to a third embodiment of the present invention.

FIG. 9 is a block diagram showing a configuration of a questionnaire analysis system according to a third embodiment of the invention. The questionnaire analysis system of the third embodiment comprises respondent computers 911 to 91N, a network 92, a database 93, a text classification engine 94, and a claimant computer 95.

The respondent computers 911 to 91N are computers, portable information terminals, cellular phones, and other devices having transmission function of message, mail and the like, which are connected to the network 92.

The network 92 includes various networks, whether wired or wireless, such as public networks, exclusive networks, or LAN.

The database 93 is connected to the network 92, and questionnaire reply statements from plural respondents transmitted from the respondent computers 911 to 91N through the network 92 are accumulated herein.

The text classification engine 94 is same as the text classification engine 14 in the questionnaire analysis system of the first embodiment shown in FIG. 1, except that the rule output means 19 can transmit the knowledge of the rule format as a result of analysis through the network 92. Therefore, same reference numerals are given to the corresponding parts and detailed description is omitted.

The claimant computer 95 requests knowledge of rule format as a result of analysis to the text classification engine 94 through the network 92, and receives the knowledge of rule format of analysis result from the text classification engine 94 through the network 92.

The operation of the questionnaire analysis system of the third embodiment having such configuration is explained below.

The questionnaire respondents send questionnaire reply statements including free reply description in natural language from respondent computers 911 to 91N through the network 92. Suppose the number of respondents to be N.

The database 93 is connected to the network 92, and accumulates questionnaire reply statements from plural questionnaire respondents.

The text classification engine 94 reads out plural questionnaire reply statements from the database 93, an extracts the knowledge of rule format for classifying the questionnaire reply statements. The text classification engine 94 is connected to the network 92, and distributes the knowledge of rule format of analysis result through the network 92 depending on the request from the claimant computer 95. The detail of operation of the text classification engine 94 is same as that of the text classification engine 14 of the questionnaire analysis system of the first embodiment, except that the knowledge of rule format of analysis result is distributed through the network 92, and the description of detail is omitted.

The questionnaire analysis system of the third embodiment can be applied, for example, in the following business. Undertaking an enterprise image survey or a questionnaire about specific merchandise or service, the questionnaire of the items as shown in FIG. 2 is operated on the network 92, and the questionnaire reply statements including free reply description in natural language collected online through the network 92 are accumulated in the database 93, and questionnaire reply statements are called therefrom, and the analysis results obtained by using the text classification engine 94 are distributed through the network 92 to the claimants when requested.

Fourth Embodiment

Figure 10:
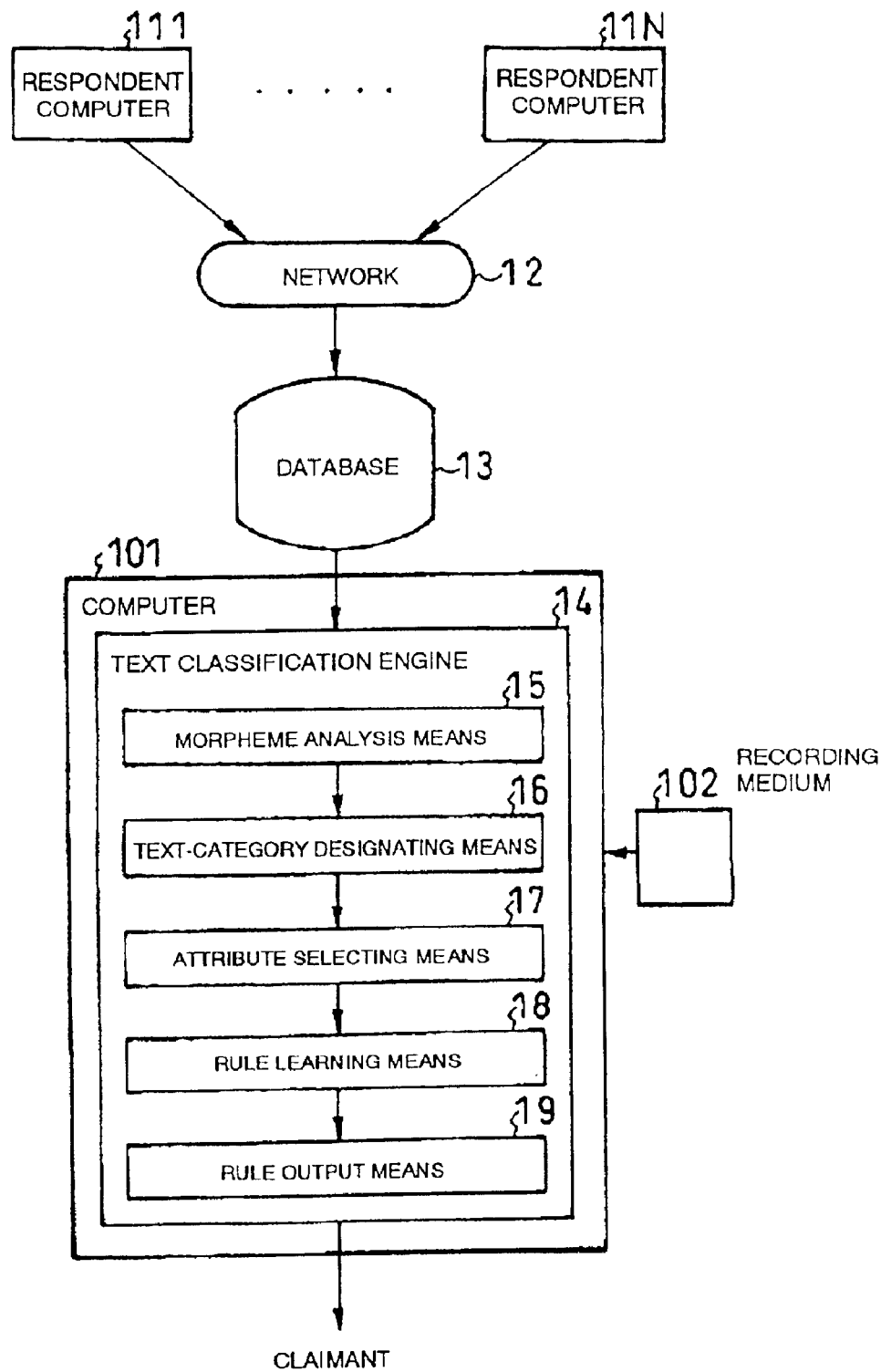
FIG. 10 is a block diagram showing a configuration of a questionnaire analysis system according to a fourth embodiment of the present invention.

FIG. 10 is a block diagram showing a configuration of a questionnaire analysis system according to a fourth embodiment of the invention. The questionnaire analysis system of the fourth embodiment is similar to the questionnaire analysis system of the first embodiment shown in FIG. 1, except that a recording medium 102 recording a text classification engine program is incorporated in a computer 101 connected to the database 13, and the other composition is same as that of the questionnaire analysis system of the first embodiment, and corresponding parts are identified with same reference numerals and detailed description is omitted.

In the questionnaire analysis system of the fourth embodiment having such configuration, the text classification engine program is read into the computer 101 from the recording medium 102, and controls the operation of the computer 101 as the text classification engine 14 including the morpheme analysis means 15, category-text designating means 16, attribute selecting means 17, rule learning means 18, and rule output means 19. The detail of operation of the text classification engine 14 on the computer 101 is exactly same as in the case of the questionnaire analysis system of the first embodiment, and detailed description is omitted.

Fifth Embodiment

Figure 11:
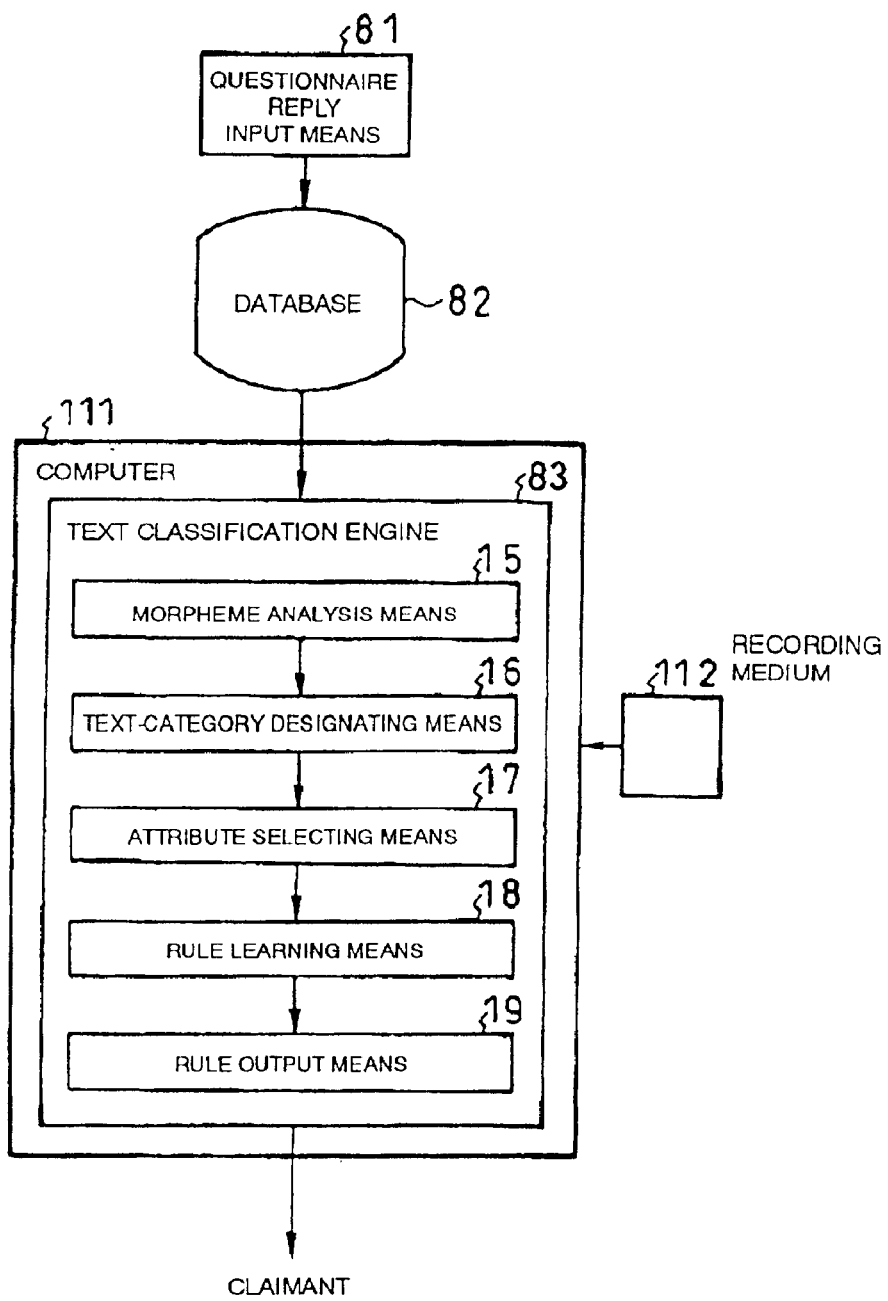
FIG. 11 is a block diagram showing a configuration of a questionnaire analysis system according to a fifth embodiment of the present invention.

FIG. 11 is a block diagram showing a configuration of a questionnaire analysis system according to a fifth embodiment of the invention. The questionnaire analysis system of the fifth embodiment is similar to the questionnaire analysis system of the second embodiment shown in FIG. 2, except that a recording medium 112 recording a text classification engine program is incorporated in a computer 111 connected to the database 82, and the other composition is same as that of the questionnaire analysis system of the second embodiment, and corresponding parts are identified with same reference numerals and detailed description is omitted.

In the questionnaire analysis system of the fifth embodiment having such configuration, the text classification engine program is read into the computer 111 from the recording medium 112, and controls the operation of the computer 111 as the text classification engine 83 including the morpheme analysis means 15, category-text designating means 16, attribute selecting means 17, rule learning means 18, and rule output means 19. The detail of operation of the text classification engine 83 on the computer 111 is exactly same as in the case of the questionnaire analysis system of the second embodiment, and detailed description is omitted.

Sixth Embodiment

FIG. 12 is a block diagram showing a configuration of a questionnaire analysis system according to a sixth embodiment of the invention. The questionnaire analysis system of the sixth embodiment is similar to the questionnaire analysis system of the third embodiment shown in FIG. 3, except that a recording medium 122 recording a text classification engine program is incorporated in a computer 121 connected to the database 93, and the other composition is same as that of the questionnaire analysis system of the third embodiment, and corresponding parts are identified with same reference numerals and detailed description is omitted.

In the questionnaire analysis system of the sixth embodiment having such configuration, the text classification engine program is read into the computer 121 from the recording medium 122, and controls the operation of the computer 121 as the text classification engine 94 including the morpheme analysis means 15, category-text designating means 16, attribute selecting means 17, rule learning means 18, and rule output means 19. The detail of operation of the text classification engine 94 on the computer 121 is exactly same as in the case of the questionnaire analysis system of the third embodiment, and detailed description is omitted.

What is claimed is:

1. A questionnaire analysis system comprising:
   means for inputting a questionnaire statement including free reply description in natural language;
   a network for transmitting a questionnaire reply statement,
   a database for accumulating said questionnaire reply statements transmitted through said network; and
   a text classification engine for reading out said questionnaire reply statements from said database and for learning a rule for classifying said questionnaire reply statement,
   wherein said text classification engine includes:
   morpheme analysis means for analyzing morphemes in all sentences in said questionnaire reply statement accumulated in said database;
   category-text designating means for designating a category and text;
   attribute selecting means for selecting attributes in plural questionnaire reply statements being read out from said database;
   rule learning means for learning said rule for expressing said correspondence of text and category on the basis of said words selected by attributes by said attribute selecting means; and
   rule output means for issuing said rule learned by said rule learning means,
   wherein said attribute selecting means computes a difference $\Delta SC(\omega)$ between a stochastic complexity (SC) of a text set without consideration of appearance of a word and a stochastic complexity (SC) of a text set with consideration thereof, in each word $\omega$ appearing in said text, and then selects said difference $\Delta SC(\omega)$ as an attribute when said difference $\Delta SC(\omega)$ is larger than a threshold $\tau$.

2. A questionnaire analysis system comprising:
   means for inputting a questionnaire statement including free reply description in natural language;
   a network for transmitting a questionnaire reply statement,
   a database for accumulating said questionnaire reply statements transmitted through said network; and
   a text classification engine for reading out said questionnaire reply statements from said database and for learning a rule for classifying said questionnaire reply statement,
   wherein said text classification engine includes:
   morpheme analysis means for analyzing morphemes in all sentences in said questionnaire reply statement accumulated in said database;
   category-text designating means for designating said category and text;
   attribute selecting means for selecting attributes in plural questionnaire reply statements being read out from said database;
   rule learning means for learning said rule for expressing said correspondence of text and category on the basis of said words selected by attributes by said attribute selecting means; and
   rule output means for issuing said rule learned by said rule learning means,
   wherein said attribute selecting means computes a difference $\Delta SC(\omega)$ between a stochastic complexity (SC) of a text set without consideration of appearance of a word and a stochastic complexity (SC) of a text set with consideration thereof, in each word $\omega$ appearing in said text, and then selects said difference $\Delta SC(\omega)$ as an attribute when said difference $\Delta SC(\omega)$ is larger than a threshold $\tau$.

3. A questionnaire analysis system comprising:
   means for inputting a questionnaire statement including free reply description in natural language;
   a network for transmitting said questionnaire reply statement;
   a database for accumulating said questionnaire reply statement transmitted through said network;
   a text classification engine for reading out said questionnaire reply statement from said database and for learning a rule for classifying said questionnaire reply statement; and
   means for distributing said rule through said network according to a request from a claimant,
   wherein said text classification engine includes:
   morpheme analysis means for analyzing morphemes in all sentences in said questionnaire reply statement accumulated in said database;
   category-text designating means for designating said category and text;
   attribute selecting means for selecting attributes in plural questionnaire reply statements being read out from said database;
   rule learning means for learning said rule for expressing said correspondence of text and category on the basis of said words selected by attributes by said attribute selecting means; and
   rule output means for issuing said rule learned by said rule learning means,
   wherein said attribute selecting means computes a difference $\Delta SC(\omega)$ between a stochastic complexity (SC) of a text set without consideration of appearance of a word and a stochastic complexity (SC) of a text set with consideration thereof, in each word $\omega$ appearing in said text, and then selects said difference $\Delta SC(\omega)$ as an attribute when said difference $\Delta SC(\omega)$ is larger than a threshold $\tau$.

4. A questionnaire analysis system comprising:
   means for inputting a questionnaire statement including free reply description in natural language;
   a network for transmitting a questionnaire reply statement,
   a database for accumulating said questionnaire reply statements transmitted through said network; and
   a text classification engine for reading out said questionnaire reply statements from said database and for learning a rule for classifying said questionnaire reply statement,
   wherein said text classification engine includes:
   morpheme analysis means for analyzing morphemes in all sentences in said questionnaire reply statement accumulated in said database;

category-text designating means for designating a category and text;
attribute selecting means for selecting attributes in plural questionnaire reply statements being read out from said database;
rule learning means for learning said rule for expressing said correspondence of text and category on the basis of said words selected by attributes by said attribute selecting means; and
rule output means for issuing said rule learned by said rule learning means,
wherein said rule learning means:
forms said text set by replacing with an expression of $(d_1, c_1), (d_2, c_2), \ldots, (d_m, c_m)$;
selects said rules of if-then-else format and sequentially adds said selected rules to said stochastic decision list by employing said information quantity standard such as said extended stochastic complexity (SC) minimum principle or SC minimizing principle; and
removes said rules one by one from said last one of said stochastic decision list, and clips continuously until none should be removed from said viewpoint of said extended SC minimum principle.

5. A questionnaire analysis system comprising:
means for inputting a questionnaire statement including free reply description in natural language;
a network for transmitting a questionnaire reply statement,
a database for accumulating said questionnaire reply statements transmitted through said network; and
a text classification engine for reading out said questionnaire reply statements from said database and for learning a rule for classifying said questionnaire reply statement,
wherein said text classification engine includes:
morpheme analysis means for analyzing morphemes in all sentences in said questionnaire reply statement accumulated in said database;
category-text designating means for designating said category and text;
attribute selecting means for selecting attributes in plural questionnaire reply statements being read out from said database;
rule learning means for learning said rule for expressing said correspondence of text and category on the basis of said words selected by attributes by said attribute selecting means; and
rule output means for issuing said rule learned by said rule learning means,
wherein said rule learning means:
forms said text set by replacing with an expression of $(d_1, c_1), (d_2, c_2), \ldots, (d_m, c_m)$;
selects said rules of if-then-else format and sequentially adds said selected rules to said stochastic decision list by employing said information quantity standard such as said extended stochastic complexity (SC) minimum principle or SC minimizing principle; and
removes said rules one by one from said last one of said stochastic decision list, and clips continuously until none should be removed from said viewpoint of said extended SC minimum principle.

6. A questionnaire analysis system comprising:
means for inputting a questionnaire statement including free reply description in natural language;
a network for transmitting said questionnaire reply statement;
a database for accumulating said questionnaire reply statement transmitted through said network;
a text classification engine for reading out said questionnaire reply statement from said database and for learning a rule for classifying said questionnaire reply statement; and
means for distributing said rule through said network according to a request from a claimant,
wherein said text classification engine includes:
morpheme analysis means for analyzing morphemes in all sentences in said questionnaire reply statement accumulated in said database;
category-text designating means for designating said category and text;
attribute selecting means for selecting attributes in plural questionnaire reply statements being read out from said database;
rule learning means for learning said rule for expressing said correspondence of text and category on the basis of said words selected by attributes by said attribute selecting means; and
rule output means for issuing said rule learned by said rule learning means,
wherein said rule learning means:
forms said text set by replacing with an expression of $(d_1, c_1), (d_2, c_2), \ldots, (d_m, c_m)$;
selects said rules of if-then-else format and sequentially adds said selected rules to said stochastic decision list by employing said information quantity standard such as said extended stochastic complexity (SC) minimum principle or SC minimizing principle; and
removes said rules one by one from said last one of said stochastic decision list, and clips continuously until none should be removed from said viewpoint of said extended SC minimum principle.

7. A computer program product for analyzing questionnaire reply which comprises:
a morpheme analysis procedure for analyzing morphemes in all sentences in said questionnaire reply statements accumulated in a database;
a category-text designating procedure for designating a category and text in a text classification engine;
an attribute selecting procedure for selecting attributes in plural questionnaire reply statements being read out from said database;
a rule learning means for learning said rule for expressing said correspondence of text and category on said basis of said words selected by attributes by said attribute selecting procedure; and
a rule output procedure for issuing said rule learned by said rule learning procedure,
wherein said attribute selecting procedure computes a difference $\Delta SC(\omega)$ between a stochastic complexity (SC) of a text set without consideration of appearance of a word and a stochastic complexity (SC) of a text set with consideration thereof, in each word $\omega$ appearing in said text, and then selects said difference $\Delta SC(\omega)$ as an attribute when said difference $\Delta SC(\omega)$ is larger than a threshold $\tau$.

8. A questionnaire analysis system comprising:
a database for accumulating natural language questionnaire reply statements; and a text classification engine that reads out said questionnaire reply statements from said database and formulates a rule for classifying said questionnaire reply statements, said text classification engine having an attribute selector that selects attributes from a plurality of questionnaire reply statements read out from said database, wherein said attribute selector computes a difference between a stochastic complexity of a text set without consideration of an appearance of a selected word and a stochastic complexity of the text set with consideration of the selected word, and selects said difference as an attribute when said difference is larger than a threshold value.

9. The questionnaire analysis system according to claim 8, said text classification engine further comprising:

a morpheme analyzer that analyzes morphemes in all sentences in said questionnaire reply statements accumulated in said database;

category-text designating means for designating a category and the text set used by said attribute selector; and a rule formulator that formulates said rule for expressing a correspondence of the text set and the category, on the basis of the selected word of said attribute selector.

10. A computer program product for analyzing questionnaire reply which comprises:

a morpheme analysis procedure for analyzing morphemes in all sentences in said questionnaire reply statements accumulated in a database;

a category-text designating procedure for designating said category and text in said text classification engine;

an attribute selecting procedure for selecting attributes in plural questionnaire reply statements being read out from said database;

a rule learning means for learning said rule for expressing said correspondence of text and category on said basis of said words selected by attributes by said attribute selecting procedure; and a rule output procedure for issuing said rule learned by said rule learning procedure, wherein said rule learning means:

forms said text set by replacing with an expression of $(d_1, c_1), (d_2, c_2), \ldots, (d_m, c_m)$;

selects said rules of if-then-else format and sequentially adds said selected rules to said stochastic decision list by employing said information quantity standard such as said extended stochastic complexity (SC) minimum principle or SC minimizing principle; and removes said rules one by one from said last one of said stochastic decision list, and clips continuously until none should be removed from said viewpoint of said extended SC minimum principle.

* * * * *

UNITED STATES PATENT AND TRADEMARK OFFICE
CERTIFICATE OF CORRECTION

PATENT NO. : 6,876,990 B2
APPLICATION NO. : 09/805114
DATED : April 5, 2005
INVENTOR(S) : Kenji Yamanishi and Hang Li It is certified that error appears in the above-identified patent and that said Letters Patent is hereby corrected as shown below:

Col. 9, line 50 delete "an" insert --and--.

Col. 13, line 15 (claim 4) after "$(d_m, c_m)$" insert -- [where each $d_i$ is a multi-valued discrete vector $d_i = (\omega_{i1}, \omega_{i2}, ..., \omega_{in})$ ($i = 1, ..., m$), $\omega_{ij}$ is 1 when word obtained by attribute selection $\omega_j$ ($j = 1, ..., n$) appears in said i-th text, or 0 otherwise, $c_i$ expresses said value (label) of said category according to said i-th text and each $c_i$ is 1 when belonging to a specific category, or 0 otherwise, and m is said number of texts];--.

Col. 13, line 55 (claim 5) after "$(d_m, c_m)$" insert -- [where each $d_i$ is a multi-valued discrete vector $d_i = (\omega_{i1}, \omega_{i2}, ..., \omega_{in})$ ($i = 1, ..., m$), $\omega_{ij}$ is 1 when word obtained by attribute selection $\omega_j$ ($j = 1, ..., n$) appears in said i-th text, or 0 otherwise, $c_i$ expresses said value (label) of said category according to said i-th text and each $c_i$ is 1 when belonging to a specific category, or 0 otherwise, and m is said number of texts];--.

Col. 14, line 30 (claim 6) after "$(d_m, c_m)$" insert -- [where each $d_i$ is a multi-valued discrete vector $d_i = (\omega_{i1}, \omega_{i2}, ..., \omega_{in})$ ($i = 1, ..., m$), $\omega_{ij}$ is 1 when word obtained by attribute selection $\omega_j$ ($j = 1, ..., n$) appears in said i-th text, or 0 otherwise, $c_i$ expresses said value (label) of said category according to said i-th text and each $c_i$ is 1 when belonging to a specific category, or 0 otherwise, and m is said number of texts];--.

Col. 16, line 16 (claim 10) after "$(d_m, c_m)$" insert -- [where each $d_i$ is a multi-valued discrete vector $d_i = (\omega_{i1}, \omega_{i2}, ..., \omega_{in})$ ($i = 1, ..., m$), $\omega_{ij}$ is 1 when word obtained by attribute selection $\omega_j$ ($j = 1, ..., n$) appears in said i-th text, or 0 otherwise, $c_i$ expresses said value (label) of said category according to said i-th text and each $c_i$ is 1 when belonging to a specific category, or 0 otherwise, and m is said number of texts];--.

Signed and Sealed this

Eleventh Day of September, 2007

JON W. DUDAS
*Director of the United States Patent and Trademark Office*